(12) United States Patent
Matoba et al.

(10) Patent No.: US 8,818,268 B2
(45) Date of Patent: Aug. 26, 2014

(54) CONTENT DATA DISTRIBUTION SYSTEM, CONTENT DATA DELIVERY METHOD, AND SEMICONDUCTOR DEVICE

(75) Inventors: Tsukasa Matoba, Kawasaki (JP); Shinichi Matsukawa, Tokyo (JP); Akihiro Kasahara, Chiba (JP); Hiroyuki Sakamoto, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 157 days.

(21) Appl. No.: 13/425,919

(22) Filed: Mar. 21, 2012

(65) Prior Publication Data
US 2012/0329392 A1   Dec. 27, 2012

(30) Foreign Application Priority Data
Jun. 24, 2011   (JP) .................................. 2011-141109

(51) Int. Cl.
*H04B 5/00* (2006.01)
(52) U.S. Cl.
USPC ...... 455/41.1; 455/41.2; 455/556.2; 455/405; 455/410; 455/67.11; 369/49.17; 711/108
(58) Field of Classification Search
USPC ............ 455/41.1, 41.2, 556.2, 405, 406, 410, 455/67.11; 365/49.17, 49.18; 711/108
See application file for complete search history.

(56) References Cited

U.S. PATENT DOCUMENTS

| | | | | |
|---|---|---|---|---|
| 8,005,426 B2* | 8/2011 | Huomo et al. | ............... | 455/41.2 |
| 8,140,649 B2* | 3/2012 | Durand et al. | ............... | 709/219 |
| 8,245,142 B2* | 8/2012 | Mizrachi et al. | ............. | 715/744 |
| 8,374,592 B2* | 2/2013 | Proctor et al. | .............. | 455/414.3 |
| 8,385,896 B2* | 2/2013 | Proctor et al. | .............. | 455/414.3 |
| 2005/0213767 A1 | 9/2005 | Matsukawa et al. | | |
| 2008/0320396 A1* | 12/2008 | Mizrachi et al. | ............... | 715/744 |
| 2009/0098825 A1* | 4/2009 | Huomo et al. | ............... | 455/41.1 |
| 2009/0222517 A1* | 9/2009 | Kalofonos et al. | ............ | 709/204 |
| 2009/0234909 A1* | 9/2009 | Strandell et al. | .............. | 709/203 |
| 2011/0059692 A1* | 3/2011 | Hyoung et al. | .............. | 455/41.1 |
| 2012/0166338 A1* | 6/2012 | Agnelli et al. | .................. | 705/44 |

FOREIGN PATENT DOCUMENTS

| | | |
|---|---|---|
| JP | 2002-366480 | 12/2002 |
| JP | 2007-53665 | 3/2007 |
| JP | 2008-250643 | 10/2008 |
| JP | 2009-3552 | 1/2009 |
| JP | 2010-262330 | 11/2010 |

OTHER PUBLICATIONS

Office Action mailed Apr. 8, 2014 in Japanes Patent Application No. 2011-141109 filed Jun. 24, 2011 (With English Abstract).

* cited by examiner

*Primary Examiner* — Marceau Milord
(74) *Attorney, Agent, or Firm* — Oblon, Spivak, McClelland, Maier & Neustadt, L.L.P.

(57) ABSTRACT

In this content data delivery method, content data is transmitted from a content server to a first semiconductor device through a network. Then, the content data, content ID identifying the content data, and route data showing a route through which the content data is transmitted are transmitted from the first semiconductor device to a second semiconductor device using close-proximity wireless communication. Thereafter, the content ID and the route data are transmitted from the second semiconductor device to the content server. In addition, based on the route data, a reward corresponding to the content ID is calculated for the first semiconductor device, and the reward is provided to the first semiconductor device.

20 Claims, 8 Drawing Sheets

US 8,818,268 B2

CONTENT DATA DISTRIBUTION SYSTEM, CONTENT DATA DELIVERY METHOD, AND SEMICONDUCTOR DEVICE

CROSS REFERENCE TO RELATED APPLICATIONS

This application is based on and claims the benefit of priority from prior Japanese Patent Application No. 2011-141109, filed on Jun. 24, 2011, the entire content of which are incorporated herein by reference.

FIELD

Embodiments described herein relate to a content data distribution system, a content data delivery method and a semiconductor device.

BACKGROUND

Content data distribution systems for delivering content data such as music data or movie data through the Internet is becoming popular, since the Internet and electronic commerce is becoming popular. In such content data distribution systems, a user decides to purchase content data based on motivations caused by various events. Above all, a user is likely to use so-called "word of mouth" from acquaintances or friends for reference. Therefore, it is desirable to promote sales of content data based on such "word of mouth".

DETAILED DESCRIPTION

In the content data delivery method according to the embodiments described hereinbelow, content data is transmitted from a content server to a first semiconductor device through a network. Then, the content data, content ID identifying the content data, and route data showing a route through which the content data is transmitted are transmitted from the first semiconductor device to a second semiconductor device using close-proximity wireless communication. Thereafter, the content ID and the route data are transmitted from the second semiconductor device to the content server. In addition, based on the route data, a reward corresponding to the content ID is calculated for the first semiconductor device, and the reward is provided to the first semiconductor device.

Embodiments of the present invention are described with reference to the drawings in detail.

First Embodiment

Referring now to FIGS. 1 to 5, a first embodiment of the present invention is described hereinbelow.

Figure 1:
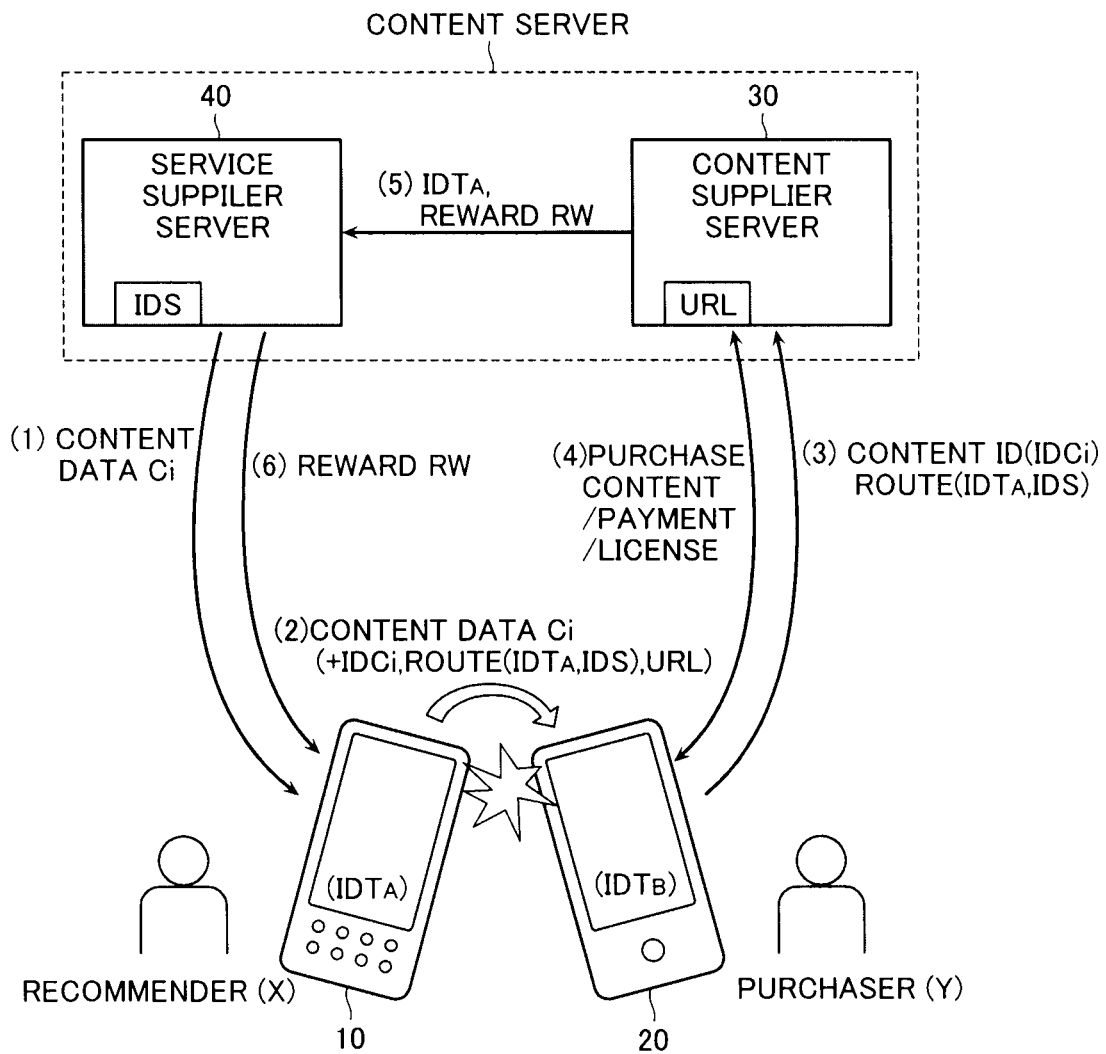
FIG. 1 is a conceptual diagram showing the outlines of the content data delivery method according to the first embodiment.

FIG. 1 is a conceptual diagram showing the outline of the content data distribution system and method according to the first embodiment.

In this embodiment, each of plural mobile terminals (in FIG. 1, two mobile terminals, i.e., a first mobile terminal 10 and a second mobile terminal 20 are illustrated as an example) as examples of semiconductor devices receives content data delivered from a content server. In addition, this embodiment provides a system for recommending content data obtained in this way among the plural mobile terminals. This system aims to promote distribution of content data. The outlines of the content data distribution system and method according to the present embodiment are described with reference to FIG. 1 hereinbelow.

This content data distribution system includes, for example, a content supplier server 30, and a service supplier server 40. The content supplier server 30 is controlled by a content supplier who provides or sells content data. The service supplier server 40 introduces, recommends, and acts as an advertising agent of the content data provided by the content supplier server 30 on the WEB to mediate distribution or sale of the content data.

The content supplier server 30 and service supplier server 40 together forms a content data server (in a broad sense) for providing content data to the mobile terminals 10 and 20. Note that it is also possible to employ a configuration in which the content supplier server 30 delivers content data directly to the mobile terminals 10 and 20 without the service supplier server 40 interposed therebetween. The content supplier server 30 may be further divided into a plurality of servers such as a portal server, a charging server and the like.

The outline of the content data delivery method is described with reference to FIG. 1 hereinbelow. Here, as an example, an explanation is made for a case where the first mobile terminal 10 acquires content data Ci first, and thereafter an owner X (a recommender) of the first mobile terminal 10 recommends the obtained content data to an owner Y (a purchaser) of the second mobile terminal 20. On the contrary, content data that the owner Y of the second mobile terminal 20 acquired first may be recommended to the owner X of the first mobile terminal 10. Since the operation or the like is the same for the both cases, the explanation of the latter is omitted here.

At first, the owner X of the first mobile terminal 10 accesses the service supplier server 40, and obtains content data Ci after finishing payment procedure or the like ((1)). Then, when the owner X recommends the content data Ci to the owner Y, the content data Ci is transmitted from the first mobile terminal 10 to the second mobile terminal using a built-in close-proximity wireless communication unit ((2)). In this case, a content ID (IDCi) corresponding to the content data Ci, route data ROUTE that indicates through what kind of route (path) the content data Ci has been obtained, and the URL (Uniform Resource Locator) of the content supplier server 30 are transmitted together with the content data Ci. The route data ROUTE includes, for example, a service supplier ID (IDS) for identifying a service supplier server 40, and a terminal ID ($IDT_A$) of the first mobile terminal 10 owned by the recommender X. In the following explanation, when the route data ROUTE includes $IDT_A$ and IDS, it is expressed as ROUTE ($IDT_A$ and IDS).

A communication unit in conformity with the standard of TransferJet™ can be used for a close-proximity wireless communication unit. TransferJet has a very short communication distance. It is controlled such that connection between couplers in two communication devices is established when they approach to each other within a certain access distance (e.g., 3 cm or less), while connection therebetween is shut down when they are more distant from each other than a certain access distance. Note that TransferJet assumes that devices perform data communication on an one-to-one basis. Details of TransferJet are laid open as a white paper in www.transferjet.org.

The owner Y of the second mobile terminal 20 reproduces the content data Ci received from the first mobile terminal 10. License data is added to the content data Ci, thereby a certain limit relating to a reproduction period, reproduction time, or the number of reproduction being imposed thereon.

When the owner Y likes the content data Ci, and wants to buy it, he or she accesses to the content supplier server 30, using a URL of the content supplier server 30 that has been received together with content data Ci ((3)). Then, the second mobile terminal 20 transmits the content ID (IDCi) of the content data Ci to the content supplier server 30 together with the route data ROUTE ($IDT_A$, IDS) to proceed a purchase procedure of the content data Ci.

The content supplier server 30 executes a purchase procedure of the content data Ci and payment procedure thereof in response to reception information from the second mobile terminal 20. After the completion thereof, the content supplier server 30 transmits to the second mobile terminal 20 license data that permits utilization of the content data Ci ((4)).

After completion of the purchase procedure and the payment procedure of the content data Ci, the content supplier server 30 calculates a reward RW to be provided to the recommender X, depending on a type of the received content data Ci, a price of the content data Ci, a characteristic of the recommender X and the purchaser Y, and/or other various information. This reward RW includes all events that can benefit the purchaser such as amount of cash back to a credit card of the purchaser, a gift card, increase in point of an electronic money account, discount at another shopping in the next time, and the like.

When the reward RW is calculated, the content supplier server 30 transmits the reward RW and the terminal ID ($IDT_A$) to the service supplier server 40. The service supplier server 40 transmits the reward RW to the first mobile terminal 10 based on the terminal ID ($IDT_A$) ((5), (6)).

As described above, according to this embodiment, the content data owned by the mobile terminal 10 or 20 may be recommended between the mobile terminals 10 and 20 using a close-proximity wireless communication. When a close-proximity wireless communication is used, the communication distance thereof is not more than a few cm, and the owners X and Y are in a distance where they can talk to each other. They can explain the content of the content data Ci through a face-to-face conversation, or recommend it through a face-to-face conversation. In addition, the owner X and Y need to be in the same place. This communication is more valuable than recommendation on the internet where people can access from anywhere, and anytime. TransferJet™, which is an example of close-proximity wireless communication, may provide data transmission and reception at the same speed as the USB 2.0 interface. Accordingly, music data or the like can be transmitted in a vanishingly short time without noticing a wait time. In this way, the owner Y of the second mobile terminal 20 may acquire content data C itself not from the supplier servers 30 and 40 but from a mobile terminal of another user, without Internet connection. Some viewing limitation is imposed on the content data Ci by the license data before a purchase procedure thereof is completed. However, he can formally acquire the content data Ci by accessing the content supplier server 30 to complete a purchase procedure and obtain a license data thereof.

Note that transmission of the content key between the first mobile terminal 10 and the second mobile terminal 20 is performed through close-proximity wireless communication units 17 and 27. Types of communication method are not limited to a specific one. Specifically, communication methods using wireless LAN, a USB cable, or the Ethernet may be adopted. Secure session is usually established in a route between the content supplier server 30 and the service supplier server, between a mobile terminal and the service supplier server 40, and between mobile terminals, respectively, considering stealing of content keys or the route data. Secure session is a data-transmission method in which a key-sharing process is performed beforehand or on the spot, and thereafter data is encrypted using an encryption key shared between the two persons, and transmits the encrypted data. For example, ISO/IEC 9798-2, 9798-3, 9798-4 can be used as SSL (Secure Sockets Layer) and key sharing technology.

Figure 2:
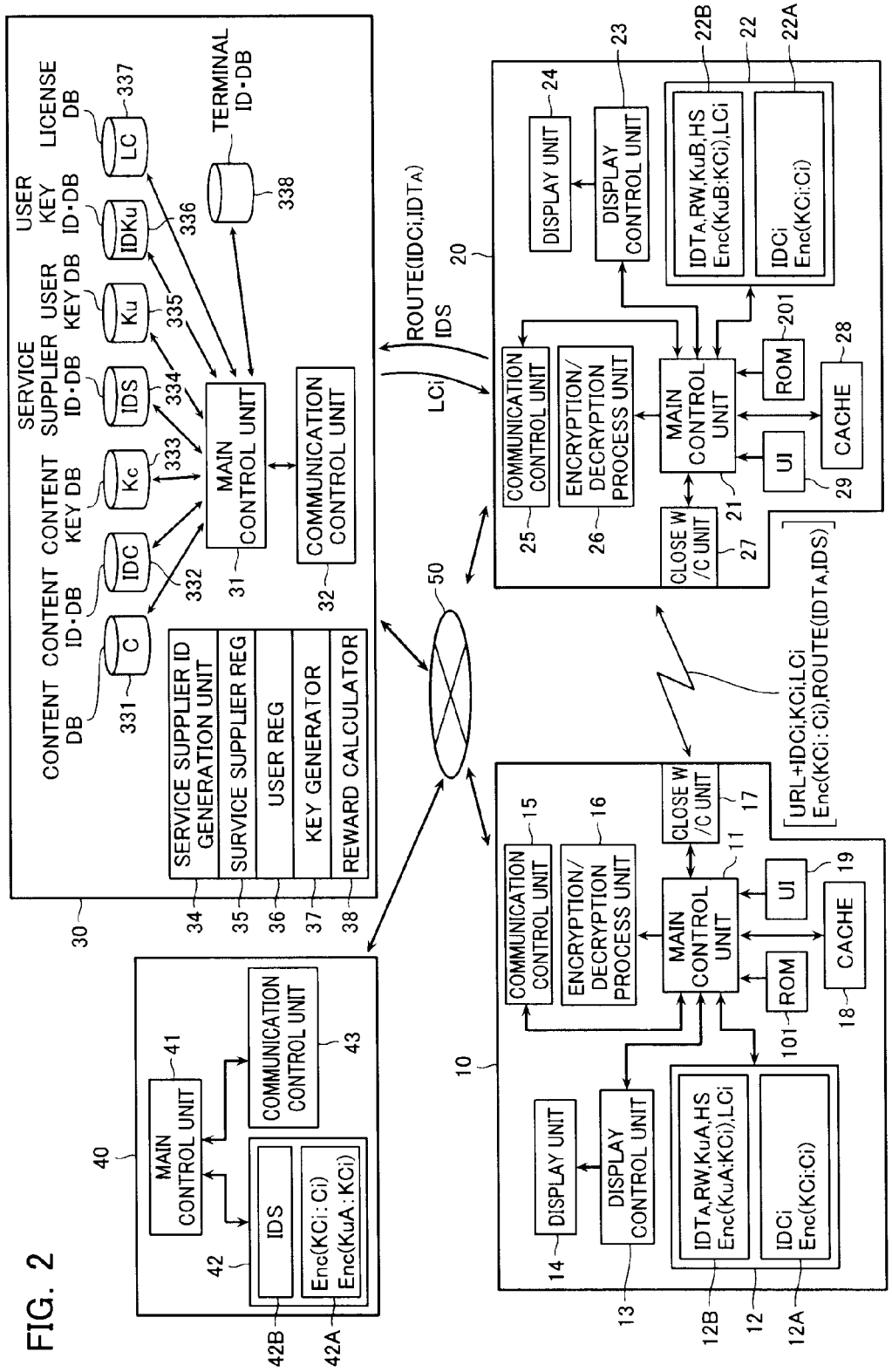
FIG. 2 is a block diagram showing the structure of the content data delivery system according to the first embodiment.

Next, specific structures of the first mobile terminal 10, the second mobile terminal 20, the content supplier server 30 and the service supplier server 40 of this embodiment are described with reference to FIG. 2.

The first mobile terminal 10 comprises, as an example, a main control unit 11, a memory unit 12, a display control unit 13, display unit 14, a communication control unit 15, a encryption/decryption processing unit 16, a close-proximity wireless communication unit 17, a cache memory 18, a user interface 19, and a ROM 101.

The main control unit 11 is a part that controls the first mobile terminal 10. A general CPU can be used therefor. The memory unit 12 comprises a normal memory unit 12A that may be accessed freely from outside, and a secret memory unit 12B that may be accessed on the condition that a predetermined authentication procedure is completed. In this example here, it is assumed that the normal memory unit 12A stores encrypted content data Enc(KCi:Ci) that is content data Ci encrypted by content key data KCi, and content ID (IDci).

In addition, it is assumed that the secret memory unit 12B stores terminal ID ($IDT_A$), reward RW, user key data KuA which is a key unique to a user and used for encrypting the content key data Kci, history Information HS, encrypted content key data Enc (KuA:Kci), and license data LCi of the content data Ci. The display unit 14 is a liquid crystal display, for example. The display control unit 13 controls a display state of the display unit 14. The communication control unit 15 controls data communication with an external device. The encryption/decryption processing unit 16 has a function of decoding encrypted data, and in contrast encrypting plain data. The close-proximity wireless communication unit 17 may be, for example, one based on TransferJet as described above. When being based on TransferJet, the close-proximity wireless communication unit 17 may comprise a coupler capable of amplifying near-field electric field component while restricting a far-field electric field component within a certain access distance, for example, 3 cm or less.

The cache memory 18 has a function of temporarily holding data in various data processes. The user interface 19 is a part in charge of inputting various types of data from a user. For example, the user interface 19 is a keyboard or a touch panel. The ROM 101 stores a program for causing the main control unit 11 to perform a content-data delivery method according to the present embodiment.

The second mobile terminal 20 comprises a main control unit 21, a memory unit 22, a display control unit 23, a display unit 24, a communication control unit 25, an encryption/decryption processing unit 26, a close-proximity wireless communication unit 27, a cache memory 28, a user interface 29 and a ROM 201. Since they the same as the members with the same names in the first mobile terminal 10, the detailed description of these members are omitted hereinbelow.

The content supplier server 30 comprises a main control unit 31, a communication control unit 32, various databases 331-338, a service supplier ID generation unit, a service supplier registration unit 35, a user registration unit 36, a key generation unit 27 and a reward calculation unit 38.

The main control unit 31 entirely controls the content supplier server 30, while the communication control unit 32 controls data communication with an external device.

The content data base (DB) 331 stores a large large number of pieces of content data C as delivery objects, providing interrelationship to the content data with corresponding content ID, for example. The content ID database 332 stores content ID corresponding to the content data C.

The content key database 333 stores content key data KC for encrypting content data C. The service supplier ID database 334 stores service supplier ID (IDS) for identifying a service supplier server 40, while providing interrelationship to the service supplier ID (IDS) with a URL of the service supplier server 40 or the like.

The user key database 335 stores user key data Ku. The user key ID database 336 stores user key ID corresponding to the user key data Ku, while providing interrelationship to the user key ID with the user key data Ku and the and license data relating to the user key data Ku or the like.

The license database 337 stores license data LCi for providing a license of content data Ci, while providing interrelationship to the license data LCi with content ID (IDc).

The terminal ID database 338 stores terminal ID (IDT) for identifying the mobile terminal 10 and 20 while providing interrelationship thereto with the user key data Ku and credit card information of a user.

The service supplier ID generation unit 34 generates service supplier ID (IDS) in order to register a service supplier having a service supplier server 40 as a service supplier for intermediating sale of the content data provided by the content supplier server 30.

The service supplier registration unit 35 stores the generated service supplier ID (IDS) in the service supplier ID database 334 while providing interrelationship to the service supplier ID (IDS) with the service supplier' name, a URL of the service supplier server 40, and the like.

The user registration unit 36 has a function to interrelate the terminal ID (IDT) of the mobile terminals 10, 20 . . . which utilize the content data distribution system with the credit card information of the user or the like, and store such data in the terminal ID database 338. The key generation unit 37 publishes user key data for the user who completed user registration, and other various keys that are necessary for content data delivery. The reward calculation unit 38 calculates a reward RW based on the content ID (IDCi) presented and other information.

The service supplier server 40 includes a main control unit 41, a memory unit 42 and a communication control unit 43. The main control unit 41 controls overall control of the service supplier server 40. The memory unit 42 comprises a normal memory unit 42A and a secret memory unit 42B. The normal memory unit 42A stores various data to be transferred to the mobile terminal 10. The secret memory 42B stores the above-mentioned service supplier ID (IDS).

Next, the procedure for providing the content data Ci owned by the first mobile terminal 10 to the second mobile terminal 20 in the content data distribution system illustrated in FIG. 2, under recommendation of the owner X, is explained with reference to a flow chart of FIG. 3.

First, the owner X of the first mobile terminal accesses the service supplier server 40, and enjoys delivery of the content data Ci after completion of a certain purchase procedure (S11).

When the owner X thinks that the content data Ci matches the owner Y's taste, the owner X recommends the content data Ci to the owner Y. When the owner Y hopes to listen or watch the content data Ci according to the owner X's recommendation, the owner X causes the close-proximity wireless unit 17 of the first mobile terminal 10 to approach to the close-proximity wireless communication unit 27 of the second mobile terminal 20. When the both units approach within a certain access distance (e.g., 3 cm), a channel is established between the units 17 and 27.

Figure 4:
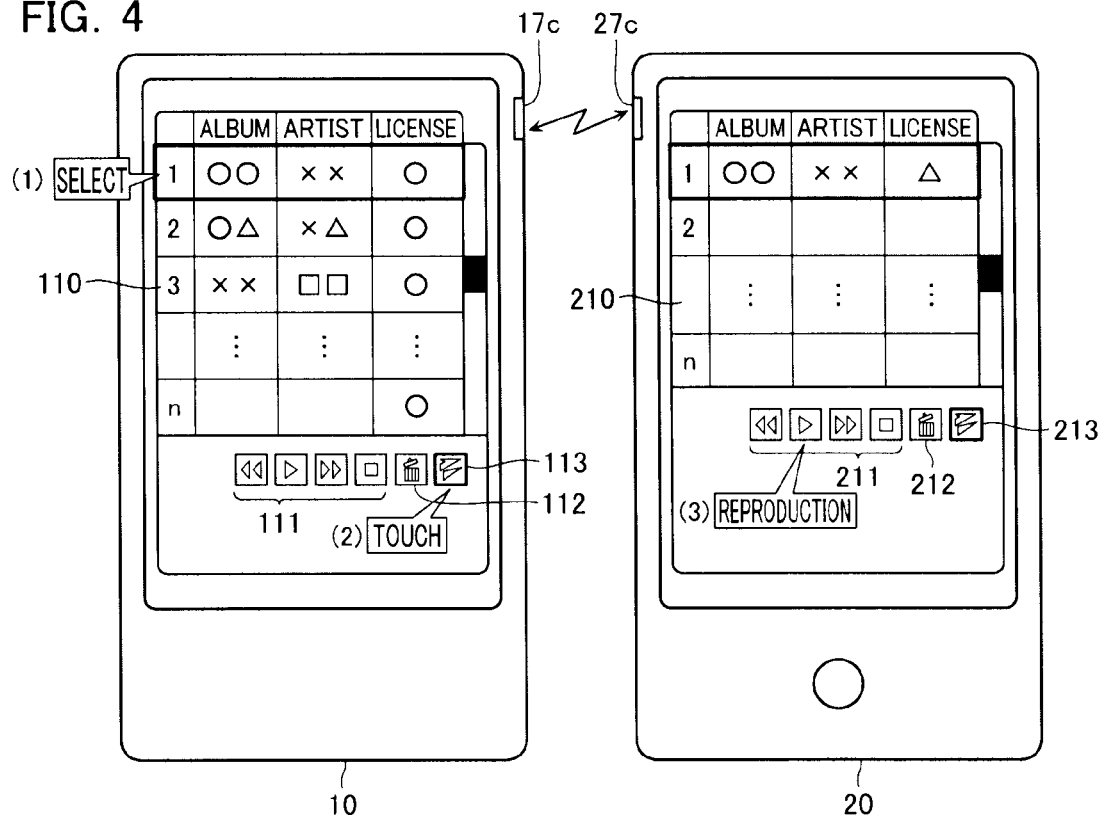
FIG. 4 shows an example of on-screen display of the mobile terminal 10 and the mobile terminal 20 during execution of the content data delivery method of FIG. 3.

As shown in FIG. 4, X displays on the display unit 14 a list (content data list 110) of content data stored in the first mobile terminal 10, and from among the list, X selects a piece of content data Ci which he or she wants to recommended to Y ((1)). The display unit 14 displays, in addition to the content data list 110, a reproduction control icon 111, a trash box icon 112, and a close-proximity wireless communication icon 113. When the owner X clicks this close-proximity wireless communication icon 113, data transmission and reception of the content data Ci is started between the mobile terminals 10 and 20.

Figure 3:
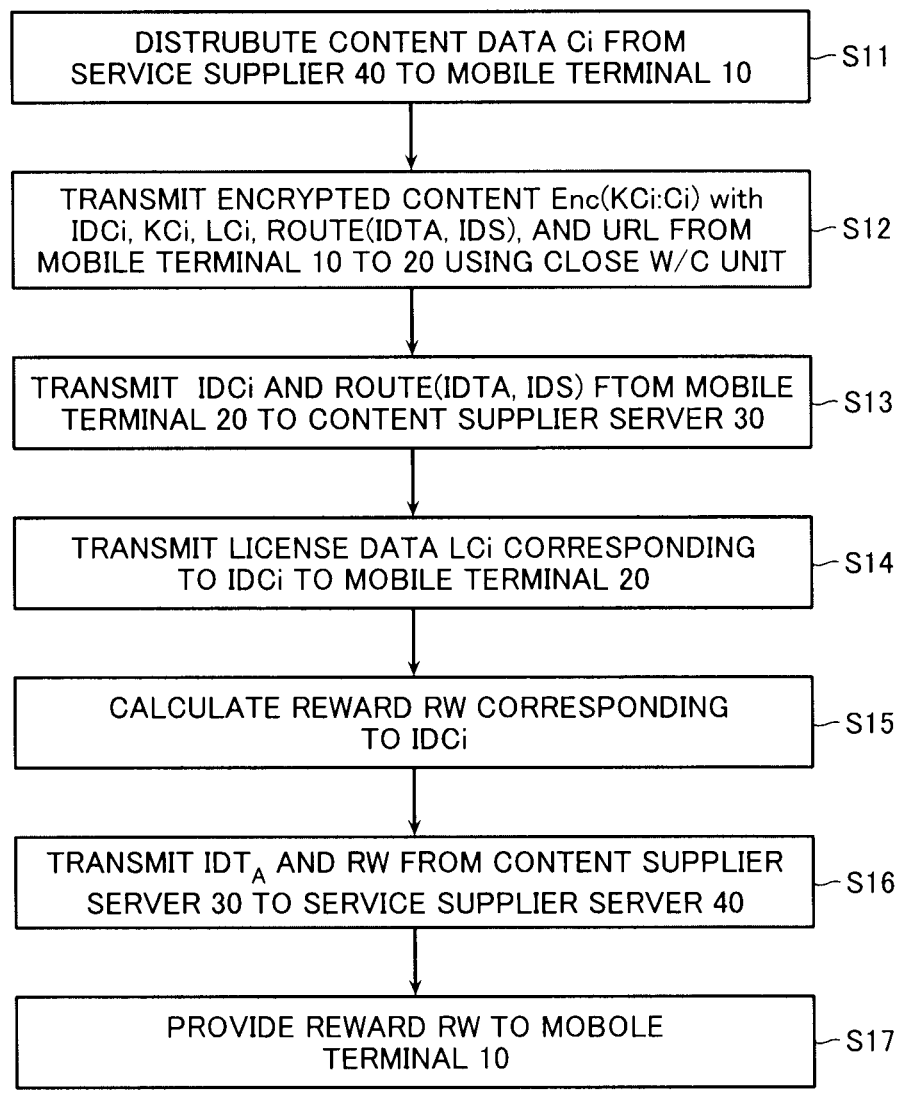
FIG. 3 is a flow chart showing an execution procedure of the content data delivery method performed by the system of FIG. 2.

The content data Ci is encrypted by content key data KCi, and is transmitted in a form of encrypted content data Enc (KCi:Ci) (step S12 of FIG. 3).

Together with this encrypted content data, content ID (IDCi), content key data KCi, license data LCi, route data ROUTE (IDT$_A$, IDS) and URL of the content supplier server 30 are transmitted by the close-proximity wireless communication. The received data is stored in the memory unit 22 in an appropriate manner.

Figure 5:
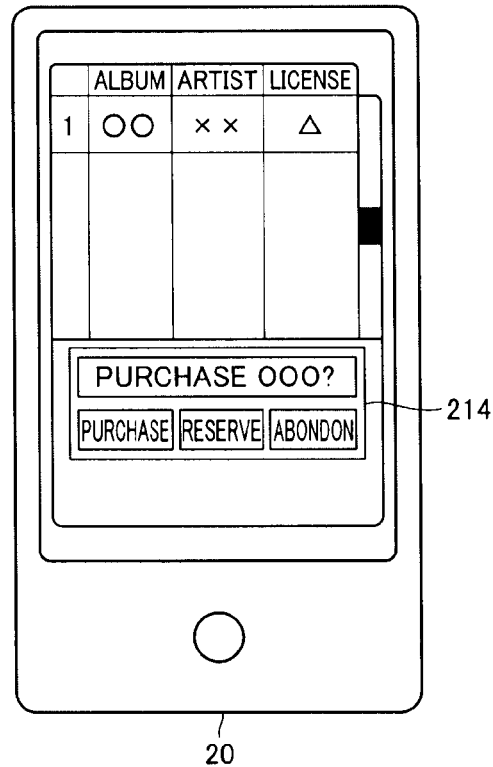
FIG. 5 shows an example of on-screen display of the mobile terminal 10 and the mobile terminal 20 during execution of the content data delivery method of FIG. 3.

In this way, the owner Y of the second mobile terminal 20 reproduces the content data Ci received from the first mobile terminal 10 (cf. FIG. 4). During reproduction or after the reproduction, a message 214 as shown in FIG. 5 is displayed on the display unit 24, showing a question whether or not the owner Y purchases the received content data Ci. When the owner Y likes the content data Ci, and hopes to purchase it, he or she clicks a "purchase" icon. When it is clicked, it shifts to a purchase procedure of the content data Ci. Note that the content data Ci and the data associated with the content data Ci are erased from the memory unit 22 when a "disposal" icon is clicked. When a "reservation" icon is clicked, after a certain time elapses, the message 214 is displayed again. When Y clicks a "purchase" icon, it shifts to step S13 of FIG. 3.

In step S13, a purchase request of the content data Ci is transmitted from the second mobile terminal 20 to the content supplier server 30. This purchase request includes content ID (IDCi) corresponding to the content data Ci in hope of the purchase, and route data ROUTE (IDT$_A$, IDS), as well as terminal ID (IDT$_B$). The purchase request is transmitted through the communication control unit and the network 50.

The content supplier server 30 verifies the terminal ID (IDT$_B$) in the terminal ID database 338 in response to this purchase request, and thereafter refers to the license database 337 to acquire the license data LCi corresponding to the desired content data Ci. Then, it transmits the license data Lci to the second mobile terminal 20 (S14). This allows the content data Ci to be used without restriction of utilization in the second mobile terminal 20.

Subsequently, the content supplier server 30 calculates a reward RW to the recommender X based on the content data Ci with respect to the recommendation, and other information (S15). This reward RW is transmitted from the content supplier server 30 to the service supplier server 40 with the terminal ID (IDT$_A$) (S16). The reward RW is provided to the mobile terminal 10 from the service supplier server 40 (S17).

With the processes described above, the delivery of content data and a series of operations including the grant of the reward RW are completed.

Note that only the mobile terminal 10 may hold data about the reward RW. It is also possible that both the service supplier server 40 and the mobile terminal 10 may hold it.

As explained above, according to the present embodiment, content data Ci can be easily recommended by the use of the close-proximity wireless communication unit between mobile terminals. In addition, the purchaser Y who receives recommendation can receive the content data Ci through the close-proximity wireless communication from the mobile terminal 10 owned by the recommender X, not from the content supplier server 30 and the service supplier server 40. Since the close-proximity wireless communication has small problems about security, and the transmission rate thereof is fast. Accordingly, he or she can acquire, under the recommendation of a trustworthy recommender X without feeling stress. Accordingly, according to the present embodiment, the sale of content data can be promoted based on "word of mouth".

Second Embodiment

Figure 6:
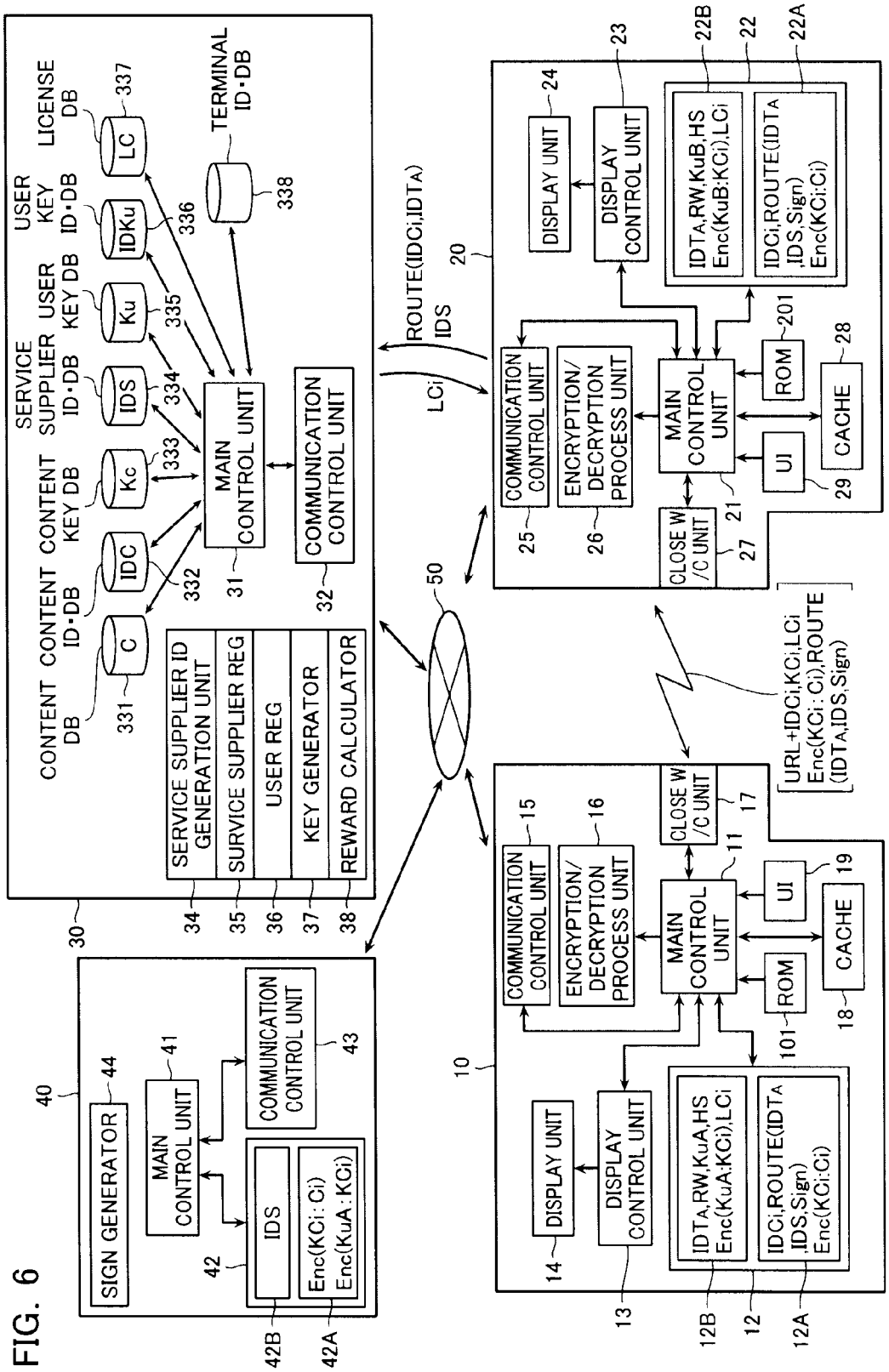
FIG. 6 is a block diagram showing the structure of the content data delivery system according to the second embodiment.

Next, the second embodiment of the present invention is described with reference to FIG. 6. FIG. 6 is a block diagram illustrating a structure of the content data delivery system according to the second embodiment. Since elements identical to those of the first embodiment are assigned with the same reference numerals as those of FIG. 2 in FIG. 6, the explanation thereof is omitted hereinbelow. The difference from the system of the first embodiment is that the service supplier server 40 includes a signature generation unit 44. Signature data Sign generated in the signature generation unit 44 is added to route data ROUTE. The route data Route (Sign) with the signature is stored in the normal memory unit 12A. Note that signature generation and signature inspection processing are widely used as a digital signature technology. For example, DSS (Digital Signature Standard) is available herein.

When the content data Ci is transferred from the service supplier server 40 to the first mobile terminal 10, the service supplier server 40 receives the terminal ID (IDT$_A$) from the first mobile terminal 10. Route data ROUTE (IDT$_A$, IDS) is generated based on the service supplier ID (IDS) and terminal ID (IDT$_A$).

In addition, signature Sign is generated in the signature generation unit 44 for the route data ROUTE (IDT$_A$, IDS), and this signature Sign is added to the route data ROUTE. Thereby, route data ROUTE (IDT$_A$, IDS, Sign) with signature is generated.

The Route data ROUTE (IDT$_A$, IDS, Sign) with the signature is transferred from the service supplier server 40 to the first mobile terminal 10. Since the signature data Sign is added thereto, there is no fear of the falsification, allowing the route data to be stored in the normal memory unit 12A. The route data with the signature is transferred from the second mobile terminal 20 to the content supplier server 30. The content supplier server 30 may inspect whether the route data ROUTE is falsified or not based on the signature data.

Third Embodiment

Then, the third embodiment of the present invention is described with reference to FIG. 7.

Figure 7:
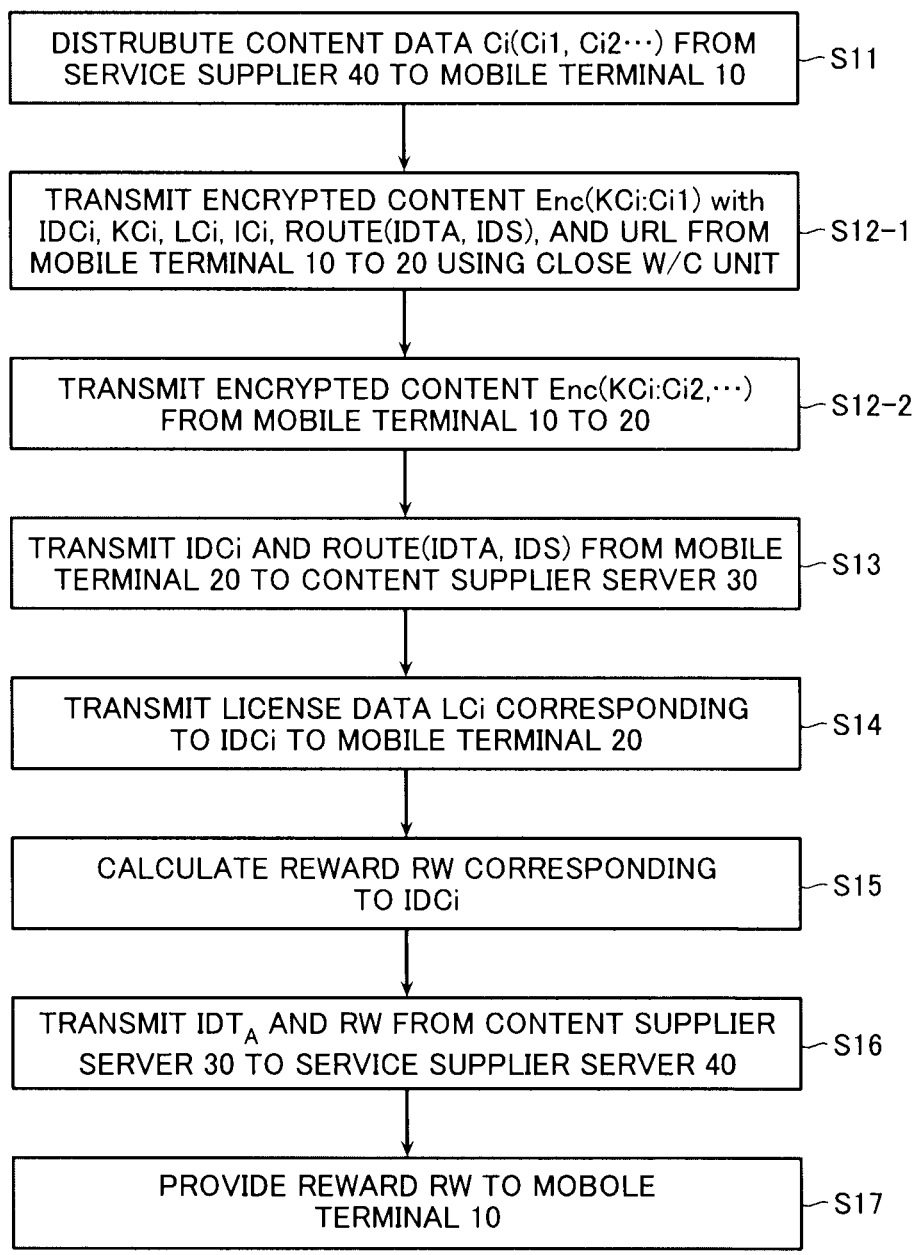
FIG. 7 is a flow chart showing an execution procedure of the content data delivery method performed by the content data distribution system according to the fourth embodiment.

FIG. 7 is a flow chart illustrating the operation of the content data distribution system according to the third embodiment. The content data distribution system of the third embodiment is generally the same as the first embodiment. However, in the third embodiment, when the content data Ci is transmitted from the first mobile terminal 10 to the second mobile terminal 20, not all but apart of plural pieces of chapter data Ci1, Ci2 . . . comprising the content data Ci are transmitted first (S12-1 of FIG. 7). Then, remaining pieces of chapter data Ci2, Ci3 . . . are received using the close-proximity wireless communication units 17 and 27 again, when the owner Y likes the content data Ci. According to this, when the owner Y does not like it, and as a result abandons the content data Ci, time required for the data communication can be shortened.

Fourth Embodiment

Figure 8:
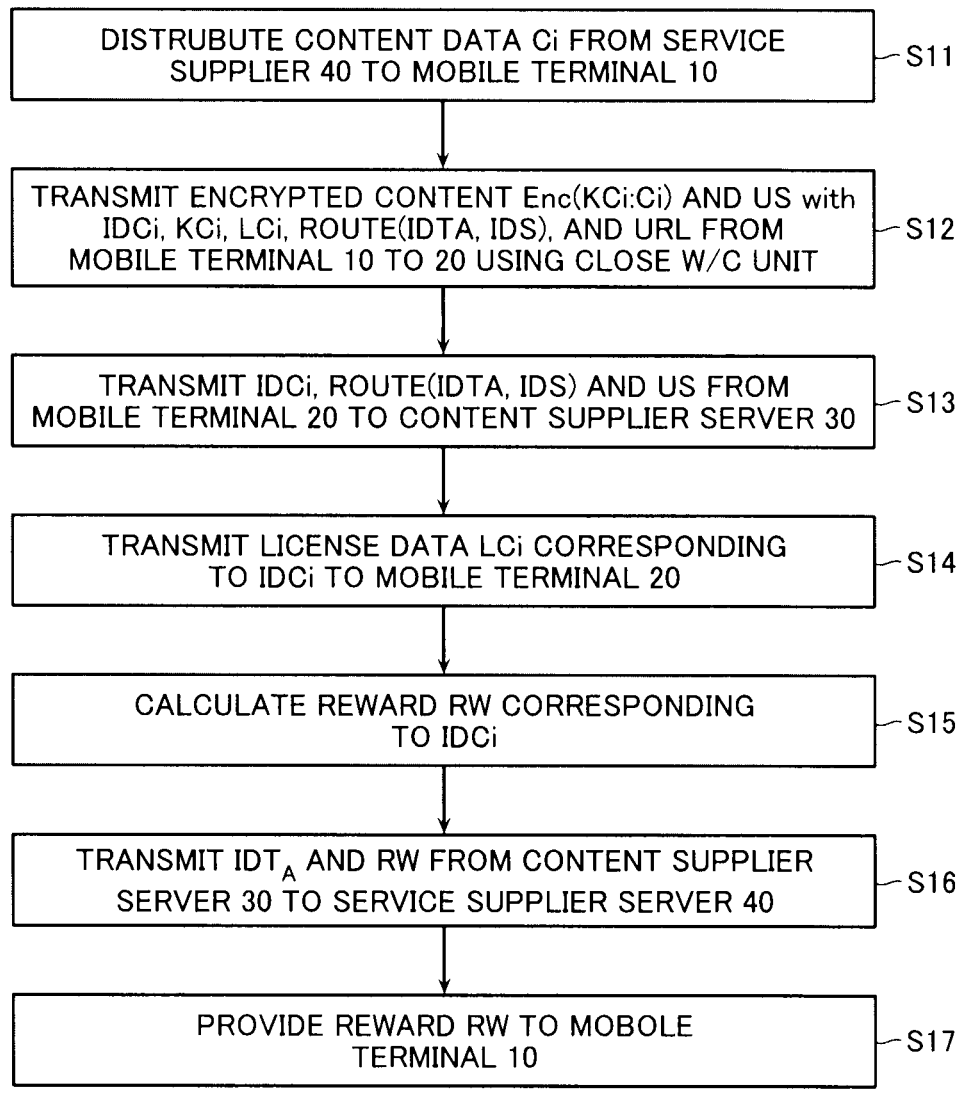
FIG. 8 is a flow chart showing an execution procedure of the content data delivery method performed by the content data distribution system according to the fourth embodiment.

Next, the fourth embodiment of the present invention is described with reference to FIG. 8. FIG. 8 is a flow chart showing the operation of the content data distribution system according to the fourth embodiment.

The structure of the content data delivery system according to the fourth embodiment is generally the same as the first embodiment. However, in the system of the fourth embodiment, utilization situation information US showing the number of times of reproduction of content data Ci in the first mobile terminal 10 or the like is transmitted, when the content data Ci is transmitted to the second mobile terminal 20 from the first mobile terminal 10. Thereafter, the usage situation information US is transferred together when content ID (IDCi), route data ROUTE and the like are transmitted from the second mobile terminal 20 to the content supplier server 30. When the content supplier server 30 calculates the reward RW based on the route data ROUTE, it is possible that the reward RW can be changed depending on the usage situation information US. According to this, it is possible that a difference of the reward RW can be provided between the case when the owner X recommends the content data by "word of mouth" despite he or she have not reproduced the content data Ci yet, and in the case when he or she recommends the content data by word of mouth after enjoying the contend data more often.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and spirit of the inventions.

Figure 9:
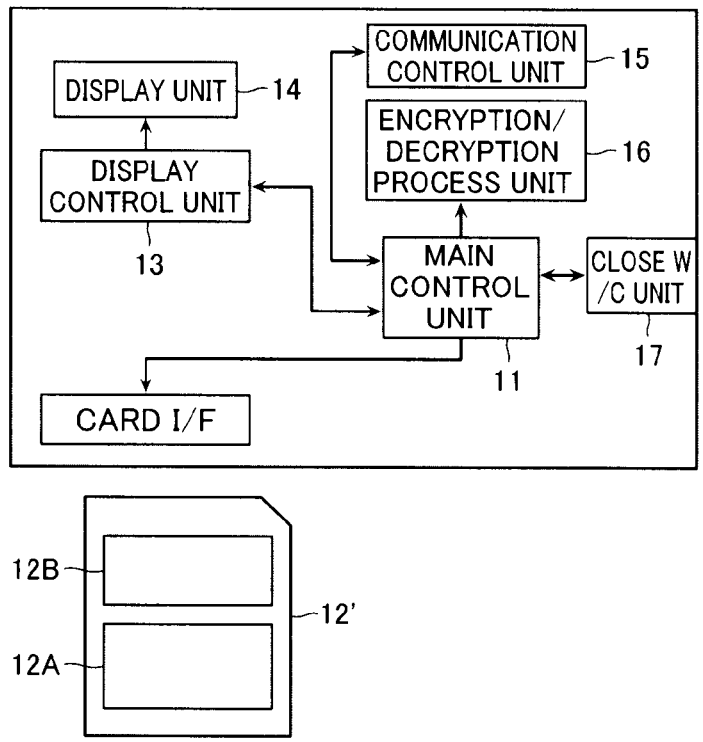
FIG. 9 shows a modified example.
Figure 10:
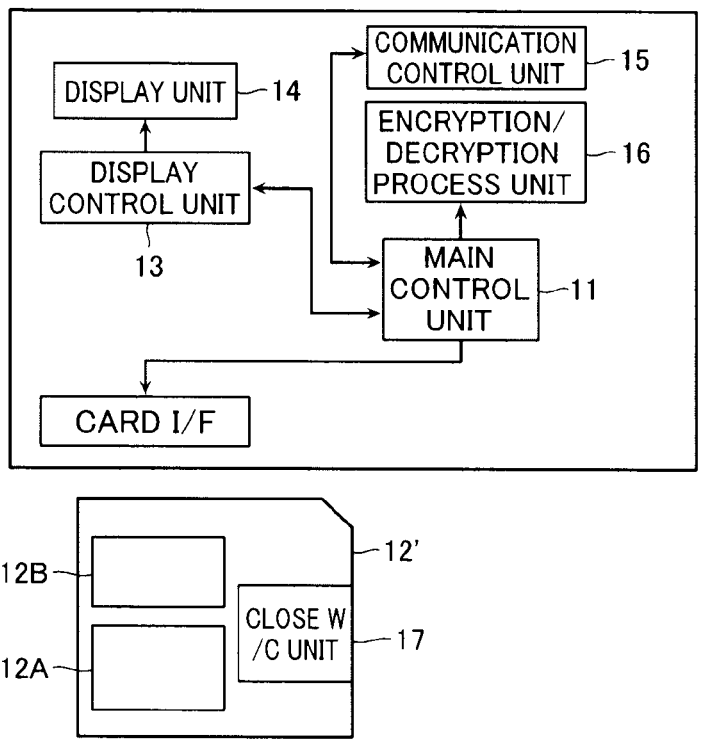
FIG. 10 shows a modified example.

For example, in above-mentioned embodiments, an example has been explained in which the memory units 12 and 22 are built-in in the mobile terminals 10 and 20. However, the present invention is not limited to this. As an example, as shown in FIG. 9, it is possible to use a mobile terminal comprising a card interface 18 and configured to be connected to an external memory card 12'. Also, as shown in FIG. 10, a close-proximity wireless communication unit 17 may be provided in an external memory card.

What is claimed is:

1. A content data delivery method, comprising:
    transmitting content data from a content server to a first semiconductor device through a network;
    transmitting, from the first semiconductor device to a second semiconductor device, using close-proximity wireless communication, the content data, content ID identifying the content data, and route data showing a route through which the content data is obtained;
    transmitting the content ID and the route data from the second semiconductor device to the content server; and
    calculating, based on the route data, a reward corresponding to the content ID, for the first semiconductor device, and providing the reward to the first semiconductor device.

2. The content data delivery method of claim 1, wherein the close-proximity wireless communication is based on a standard of TransferJet™.

3. The content data delivery method of claim 1, wherein the content server comprises a content supplier server supplying content data, and a service supplier server which receives the content data from the content server to transmit and receive data with the first semiconductor device.

4. The content data delivery method of claim 3, wherein the close-proximity wireless communication is based on a standard of TransferJet™.

5. The content data delivery method of claim 1, further comprising generating signature data in the content server, and adding the signature data to the route data in the first semiconductor device.

6. The content data delivery method of claim 1, wherein transmitting through the close-proximity communication includes:
    transmitting a part of a plurality of pieces of chapter data included in the content data to the second semiconductor device; and
    thereafter, transmitting a remainder of the plurality of pieces of chapter data to the second semiconductor device.

7. The content data delivery method of claim 1, further comprising:
    transmitting usage situation information showing usage situation of the content data in the first mobile terminal, from the first semiconductor device to the second semiconductor device, using the close-proximity wireless communication, together with the content data, the content ID and the route data; and
    transmitting the usage situation information from the second semiconductor device to the content server together with the content ID and the route data.

8. The content data delivery method of claim 7, wherein the close-proximity wireless communication is based on a standard of TransferJet™.

9. The content data delivery method of claim 7, wherein the content server comprises a content supplier server supplying content data, and a service supplier server which receives the content data from the content server to transmit and receive data with the first semiconductor device.

10. The content data delivery method of claim 9, wherein transmitting through the close-proximity communication includes:
    transmitting a part of a plurality of pieces of chapter data included in the content data to the second semiconductor device; and
    thereafter, transmitting a remainder of the plurality pieces of chapter data to the second semiconductor device.

11. The content data delivery method of claim 7, further comprising generating signature data in the content server, and adding the signature data to the route data.

12. A semiconductor device, comprising:
    a memory unit configured to store content data;
    a communication control unit configured to perform data communication with an external device to receive content data; and
    a close-proximity wireless communication unit configured to perform close-proximity wireless communication with an external device within a certain distance therefrom,
    the close-proximity wireless communication unit being configured to, when the external device is located within the certain distance, transmit to the external device, the content data, content ID for identifying the content data, and route data showing a route through which the content data is obtained.

13. The semiconductor device of claim 12, wherein the close-proximity wireless communication is based on a standard of TransferJet™.

14. The semiconductor device of claim 12, wherein the route data includes signature data generated in a content server which has provided the content data.

15. The semiconductor device of claim 12, wherein the close-proximity wireless communication unit is configured to transmit a part of a plurality of pieces of chapter data included in the content data to an external device, and thereafter, transmitting a remainder of the plurality pieces of chapter data to the external device.

16. The semiconductor device of claim 12, wherein the close-proximity wireless communication unit is configured to transmit a usage situation information showing usage situation of the content data, together with the content data, the content ID and the route data.

17. A content data distribution system, comprising:
    a content server configured to provide content data; and
    a plurality of semiconductor devices configured to receive content data delivered from the content server,
    each of the plurality of semiconductor devices comprising:
        a close-proximity wireless communication unit configured to transmit and receive the content data, content ID for identifying the content data, and route data showing a route through which the content data is obtained, to and from another semiconductor device; and
        a communication control unit configured to transmit, after receiving the content data from the close-proximity wireless communication unit, the content ID and the route data to the content server for purchasing the content data,
    the content server being configured to, when a demand of purchase of the content data including the content ID and the route data is received from another semiconductor device, calculate a reward corresponding to the content ID based on the route data, and provide the reward to one of the plurality of the semiconductor devices.

18. The content data distribution system of claim 17, wherein the content server comprises a content supplier server supplying content data, and a service supplier server which receives the content data from the content server to transmit and receive data with each semiconductor device.

19. The content data delivery system of claim 17, further comprising a signature generating unit configured to generate signature data, wherein the semiconductor device is configured to add the signature data to the route data.

20. The content data distribution system of claim 17, wherein the close-proximity communication unit transmits a part of a plurality of pieces of chapter data included in the content data to the external device, and thereafter, transmits a remainder of the plurality pieces of chapter data to the external device.

* * * * *